US010890951B1

(12) United States Patent
Watamura et al.

(10) Patent No.: US 10,890,951 B1
(45) Date of Patent: Jan. 12, 2021

(54) PORTABLE INFORMATION DEVICE WITH A FOLDABLE CHASSIS

(71) Applicant: LENOVO (SINGAPORE) PTE. LTD., Singapore (SG)

(72) Inventors: Kenji Watamura, Yokohama (JP); Chi-Hui Chen, Taipei (TW); Fumitake Mizoguchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/654,850

(22) Filed: Oct. 16, 2019

(30) Foreign Application Priority Data

Jul. 12, 2019 (JP) .................................. 2019-130277

(51) Int. Cl.
*G06F 1/16* (2006.01)
*E05D 11/00* (2006.01)
*E05D 3/06* (2006.01)
*E05D 3/12* (2006.01)

(52) U.S. Cl.
CPC ............ *G06F 1/1681* (2013.01); *E05D 3/06* (2013.01); *E05D 11/0054* (2013.01); *G06F 1/1616* (2013.01); *G06F 1/1652* (2013.01); *E05D 3/122* (2013.01); *E05Y 2900/606* (2013.01)

(58) Field of Classification Search
CPC .... G06F 1/1681; G06F 1/1652; G06F 1/1616; H04M 1/022; H04M 1/0268; E05Y 2900/606; E05D 3/122; E05D 3/06; E05D 11/0054; Y10T 16/547; Y10T 16/541
See application file for complete search history.

(56) References Cited

U.S. PATENT DOCUMENTS

| 2012/0149438 A1* | 6/2012 | Kwon | ................... H04M 1/022 455/566 |
| 2015/0241925 A1* | 8/2015 | Seo | ....................... G06F 1/1681 361/679.27 |
| 2016/0302314 A1* | 10/2016 | Bae | .......................... G06F 1/16 |

FOREIGN PATENT DOCUMENTS

JP    2018112835 A    7/2018

* cited by examiner

*Primary Examiner* — James Wu
(74) *Attorney, Agent, or Firm* — Shimokaji IP

(57) ABSTRACT

A portable information device includes a hinge device rotatably connecting one edge portions of a first chassis and a second chassis, a display, and a cover member covering a side of the hinge device. The hinge device connects the first chassis and the second chassis so as to be foldable from a usage form in which a top surface of the first chassis and a top surface of the second chassis are on substantially the same plane to a storage form in which the top surfaces of the first chassis and the second chassis face each other. The cover member is contained inside the first chassis and the second chassis in the usage form and covers a side of a gap formed by separation of the one edge portions of the first chassis and the second chassis in the storage form.

4 Claims, 9 Drawing Sheets

PORTABLE INFORMATION DEVICE WITH A FOLDABLE CHASSIS

FIELD OF THE INVENTION

The present invention relates to a foldable portable information device.

BACKGROUND OF THE INVENTION

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, the present applicant has proposed a portable information device in which not only a chassis but also a display is configured so as to be foldable by the use of a flexible display, such as organic EL (Electro Luminescence) (for example, refer to Japanese Patent No. 6,507,183).

SUMMARY OF THE INVENTION

In a configuration of the above Japanese Patent No. 6,507,183, two plate-like chassis are rotatably connected by a pair of hinge devices. In this configuration, when the chassis are folded, the hinge devices are exposed to sides of a gap formed between the chassis, which has reduced the appearance quality. Furthermore, a user can touch a bending part of a display and a bezel member directly from the sides of the gap between the chassis. Then, it is feared that the display or the bezel member may have a failure.

The present invention has been made considering the above-described problems of the prior art. It is an object of the present invention to provide a portable information device capable of suppressing reduction in appearance quality and preventing occurrence of a failure of a display or the like.

A portable information device according to a first aspect of the present invention is a portable information device, including a first chassis, a second chassis having one edge portion adjacent to one edge portion of the first chassis, a hinge device rotatably connecting the one edge portions of the first chassis and the second chassis, a display seamlessly covering the first chassis and the second chassis and foldable, and a cover member covering a side of the hinge device, in which the hinge device connects the first chassis and the second chassis so as to be foldable from a usage form in which a top surface of the first chassis and a top surface of the second chassis are on substantially the same plane to a storage form in which the top surfaces of the first chassis and the second chassis face each other, in which the cover member is contained inside the first chassis and the second chassis in the usage form and covers a side of a gap formed by separation of the one edge portions of the first chassis and the second chassis in the storage form.

The cover member may include an attaching part to be attached to the hinge device, and a cover plate part standing in the side of the hinge device, and in the storage form, a position of a tip surface of the cover plate part may be disposed inner side in a bending direction of the display than the surface of the bending part of the display.

The hinge device may include a first base plate fixed to the first chassis, a second base plate fixed to the second chassis, a first link arm having a first end portion rotatably connected to the first base plate through a first shaft, a second link arm having a first end portion rotatably connected to the second base plate through a second shaft, and a coupling plate having a first end portion rotatably connected to a second end portion of the first link arm through a third shaft and a second end portion rotatably connected to a second end portion of the second link arm through a fourth shaft, and the attaching part of the cover member may be attached to the coupling plate, and the cover plate part of the cover member may be disposed lateral to the first base plate, the second base plate, the first link arm, the second link arm, and the coupling plate.

Notch-shaped portions opened toward the one edge portions and in communication with each other may each be provided in outer peripheral edge portions of the first chassis and the second chassis, and the cover plate part may be disposed in the notch-shaped portions.

Each hinge device may be at least disposed at a first end portion and a second end portion in a longitudinal direction of the one edge portions of the first chassis and the second chassis.

The portable information device may further include a bezel member covering a part of a display surface of the first chassis and the second chassis other than the display, the hinge device may be disposed under the bezel member, and the cover member may further cover the bezel member interposed in the gap in the storage form.

According to the above-described aspects of the present invention, it is possible to suppress reduction in appearance quality and prevent occurrence of a failure of a display or the like.

DETAILED DESCRIPTION OF THE INVENTION

Hereinafter, a preferable embodiment of a portable information device according to the present invention is described in detail with reference to the attached drawings.

Figure 1:
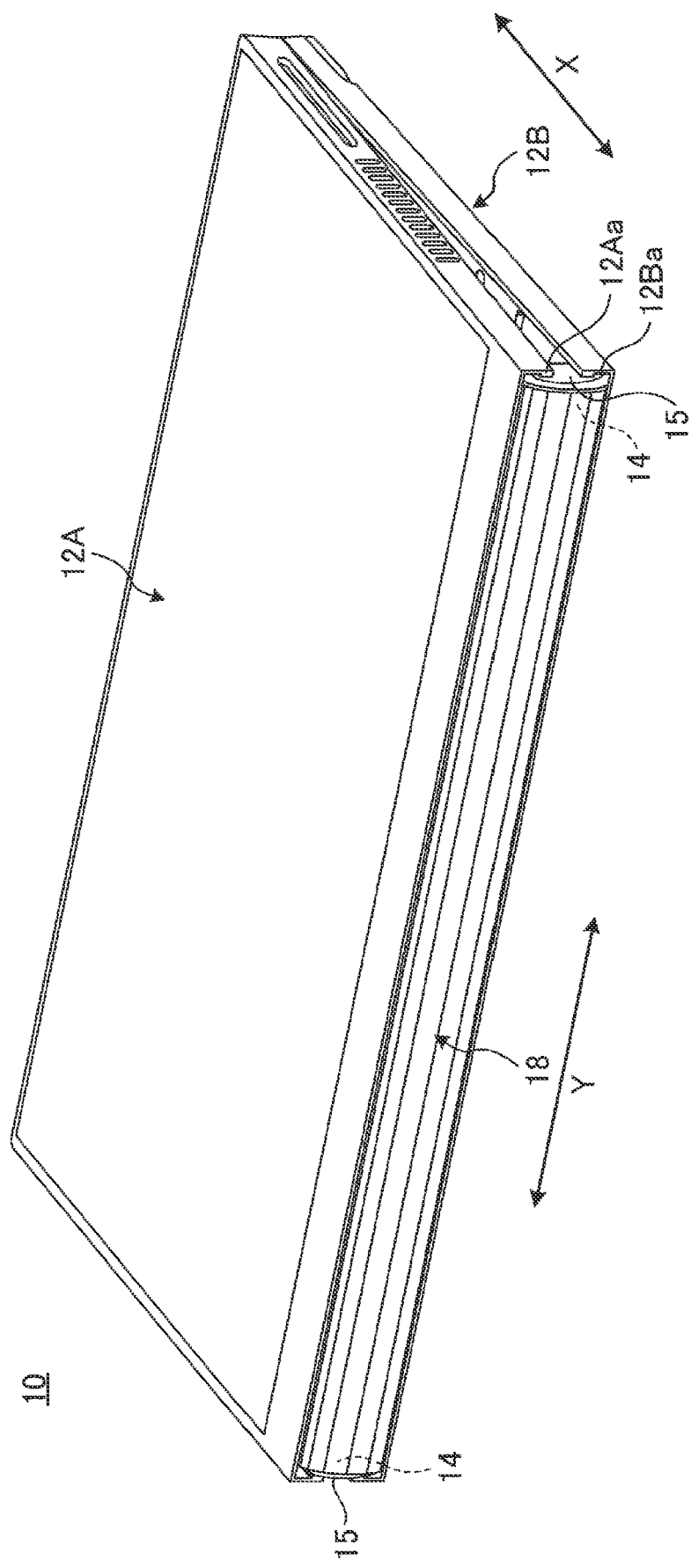
FIG. 1 is a perspective view illustrating a state where a portable information device according to one embodiment is closed into a storage form.
Figure 2:
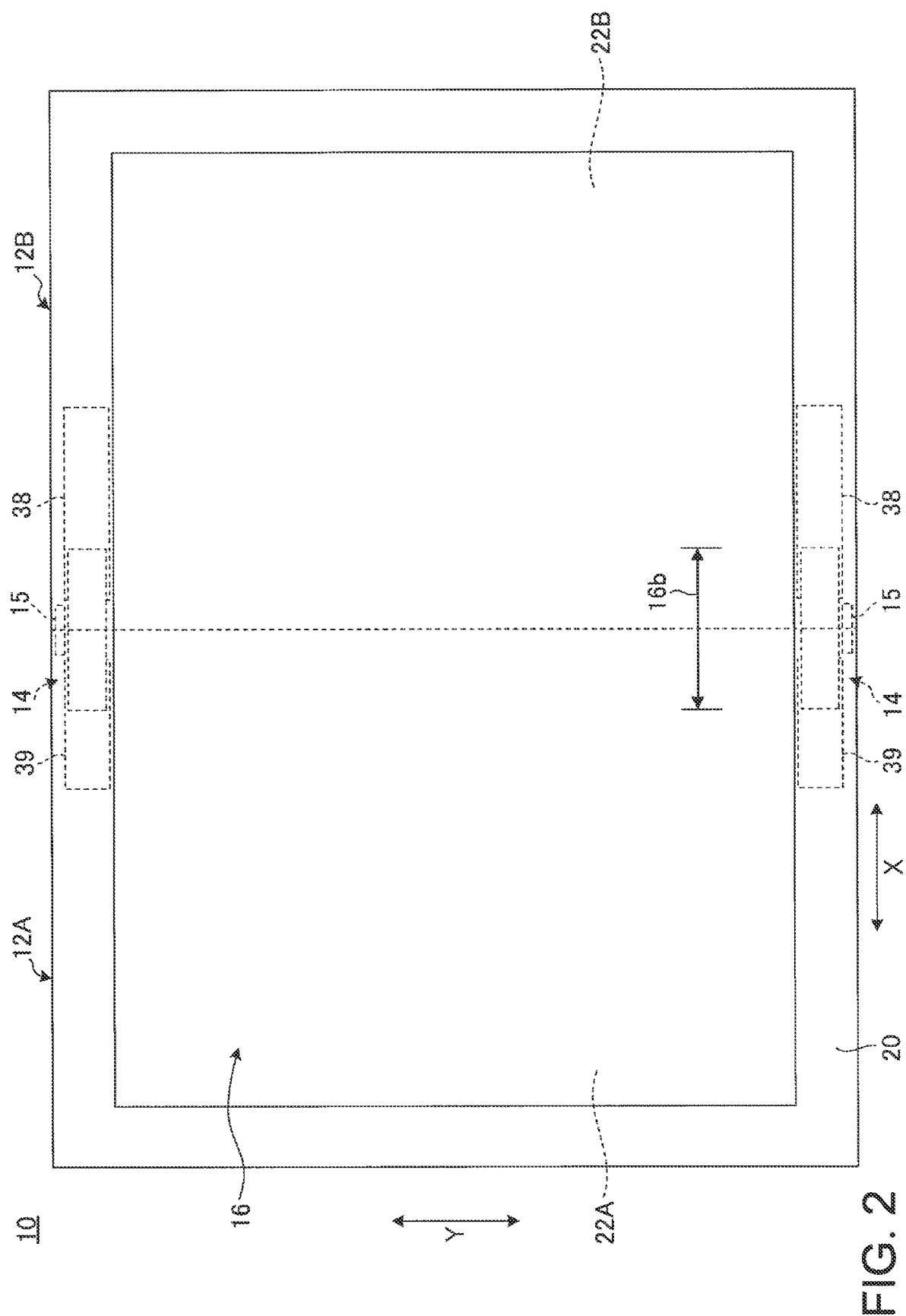
FIG. 2 is a plan view schematically illustrating a state where the portable information device illustrated in FIG. 1 is opened into a usage form.
Figure 3:
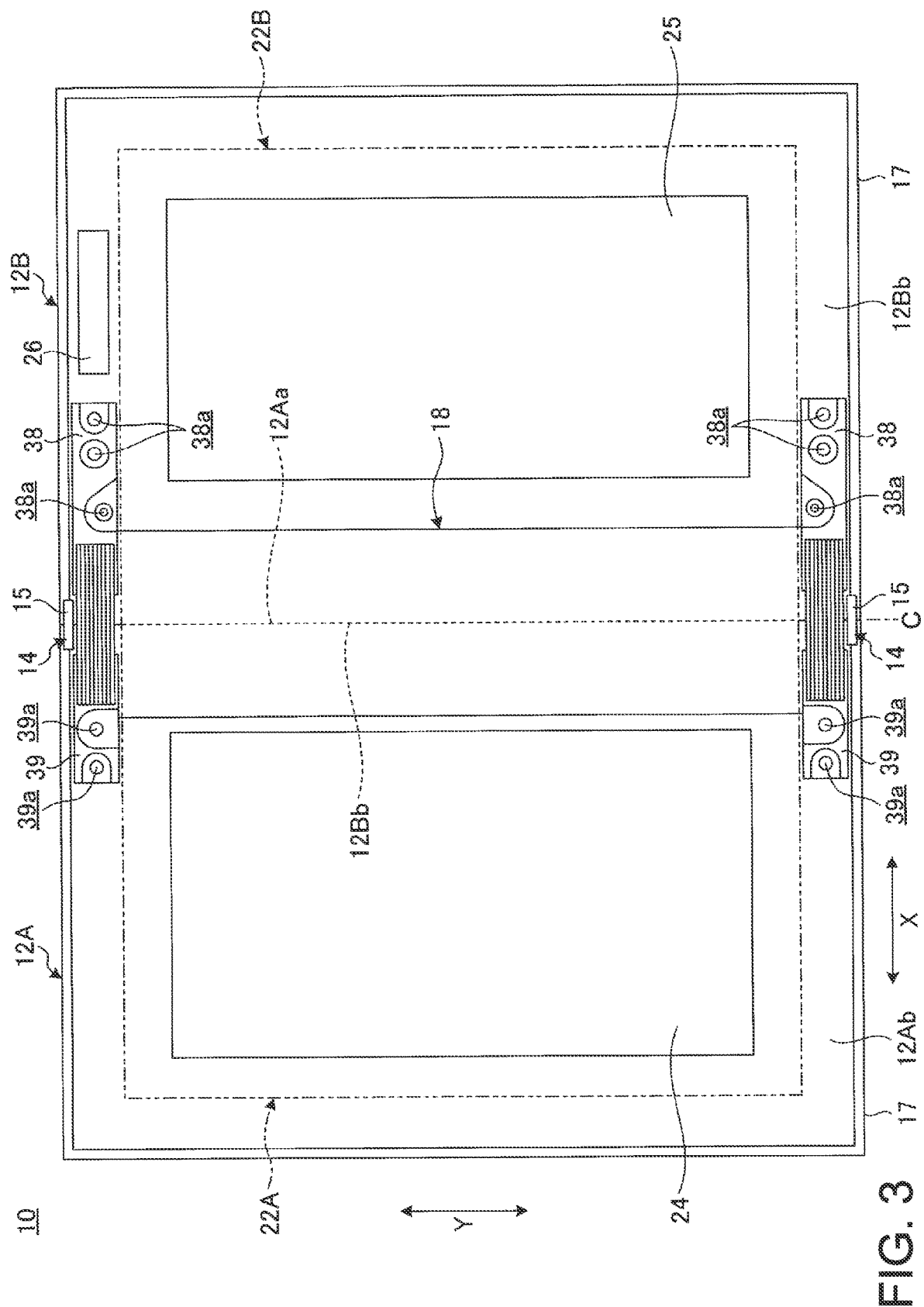
FIG. 3 is a plan view schematically illustrating the internal structure of the portable information device illustrated in FIG. 2.

FIG. 1 is a perspective view illustrating a state where a portable information device 10 according to one embodiment is closed into a storage form. FIG. 2 is a plan view schematically illustrating a state where the portable information device 10 illustrated in FIG. 1 is opened into a usage form. FIG. 3 is a plan view schematically illustrating the internal structure of the portable information device 10 illustrated in FIG. 2.

As illustrated in FIG. 1 to FIG. 3, the portable information device 10 includes a first chassis 12A, a second chassis 12B, a hinge device 14, a cover member 15, and a display 16. The portable information device 10 according to the present embodiment is a tablet PC foldable like a book. The portable information device 10 may be a cellular phone, a smartphone, an electronic notebook, a portable game console, etc.

The chassis 12A and 12B are each rectangular flat box body in which side plates 17 are formed so as to be raised on four peripheries of the bottom plate (refer to FIG. 3) and the display 16 is disposed on an opened top surface. The chassis 12A and 12B are each composed of metal plates of stainless steel, magnesium, and aluminum etc., fiber reinforced resin plates containing reinforced fibers, such as carbon fibers, or the like, for example.

The chassis 12A and 12B are disposed adjacent to each other. The chassis 12A and 12B are connected through a pair of hinge devices 14 and 14 provided in both end portions in the Y direction of one edge portions 12Aa and 12Ba as edge portions adjacent to each other. The hinge devices 14 rotatably connect the one edge portions 12Aa and 12Ba of the first chassis 12A and the second chassis 12B so that the second chassis 12B is opened and closed with respect to the first chassis 12A. The chassis 12A and 12B are rotatably connected by the hinge devices 14. The chassis 12A and 12B can be moved to a desired angular position between the storage form illustrated in FIG. 1 and the usage form illustrated in FIG. 2. A line C illustrated by the dashed-dotted line in FIG. 3 represents a bending center C serving as the center of a folding operation of the chassis 12A and 12B. In the storage form illustrated in FIG. 1, the one edge portions 12Aa and 12Ba of the chassis 12A and 12B are greatly separated from each other. Then, a boundary portion between the one edge portions 12Aa and 12Ba is covered by a backbone member 18.

Hereinafter, as illustrated in FIG. 1 to FIG. 3, the portable information device 10 is described designating a direction in which the chassis 12A and 12B are arranged as an X direction and a longitudinal direction of the backbone member 18 perpendicular to the X direction as a Y direction.

As illustrated in FIG. 1 and FIG. 3, the backbone member 18 is attached to inner surfaces 12Ab and 12Bb of the chassis 12A and 12B. The backbone member 18 is a sheet-like member of an accordion shape. One end portion in the X direction of the backbone member 18 is fixed to the first chassis 12A and the other end portion in the X direction is slidably supported by the second chassis 12B, for example.

The display 16 is a touch panel type liquid crystal display, for example. The display 16 is a flexible display, such as an organic EL having a paper structure with high flexibility, for example. The display 16 seamlessly covers display surfaces of the first chassis 12A and the second chassis 12B and is opened/closed with an opening/closing operation of the chassis 12A and 12B. A bezel member 20 is disposed on an outer peripheral edge portion of the surface (display surface) 16a of the display 16 (refer to FIG. 2). The bezel member 20 is a frame-shaped sheet-like member having flexibility. The bezel member 20 covers a non-displaying region (inactive region) of the outer peripheral edge portion excluding a display region (active region) of the surface 16a of the display 16. The bezel member 20 is attached so as to straddle the side plate 17 of the chassis 12A and 12B and the outer peripheral edge portion of the surface 16a of the display 16 (refer to FIG. 2). Thus, the bezel member 20 covers a portion of the display surfaces of the first chassis 12A and the second chassis 12B other than the display 16.

The display 16 is provided over inner surfaces 12Ab and 12Bb of the chassis 12A and 12B. The display 16 is supported with respect to the inner surfaces 12Ab and 12Bb through a first support plate 22A and a second support plate 22B (refer to FIG. 3). As illustrated by the dashed-two dotted line in FIG. 3, the support plates 22A and 22B are each a thin plate member formed into a rectangular shape. The first support plate 22A is fixed to the first chassis 12A. The second support plate 22B is fixed to the second chassis 12B. The display 16 is fixed to top surfaces of the support plates 22A and 22B using a double-sided tape, or the like. In the display 16, a belt-like region overlapping with the hinge devices 14 serves as a bending region 16b. The bending region 16b is not fixed with respect to the support plates 22A and 22B and is in a relatively movable state (refer to FIG. 7B and FIG. 7C).

The chassis 12A and 12B contain a substrate 24 mounted with various types of semiconductor chips, a battery device 25, an antenna device 26, as well as various types of electronic components, and a cooling device etc., for example. These electronic components etc. are contained in a space formed between the inner surfaces 12Ab and 12Bb and the support plates 22A and 22B.

Figure 4A:
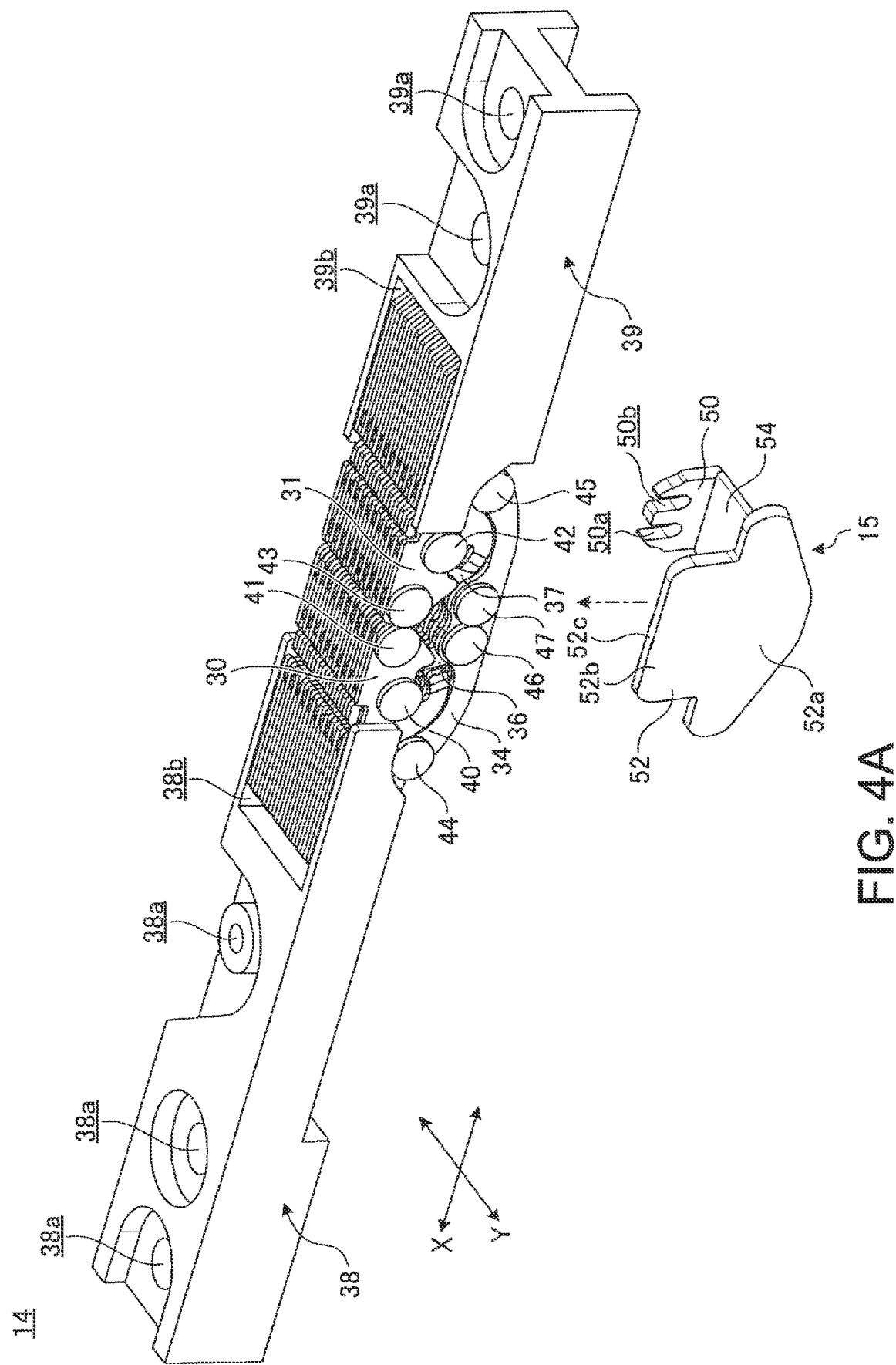
FIG. 4A is an exploded perspective view illustrating a state before a cover member is attached to a hinge device.
Figure 4B:
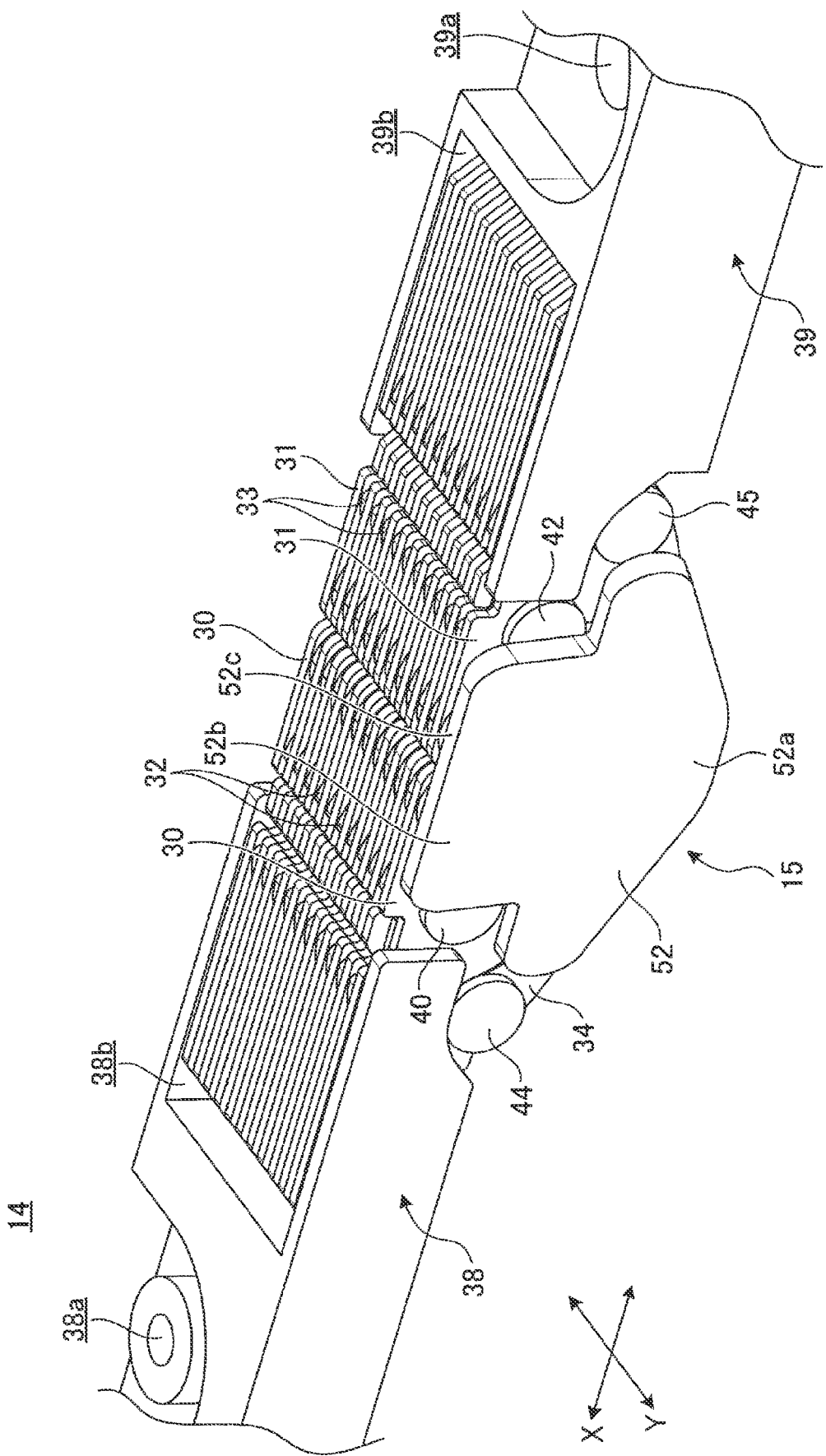
FIG. 4B is a perspective view enlarging the cover member and its surrounding part in a state where the cover member is attached to the hinge device.
Figure 5:
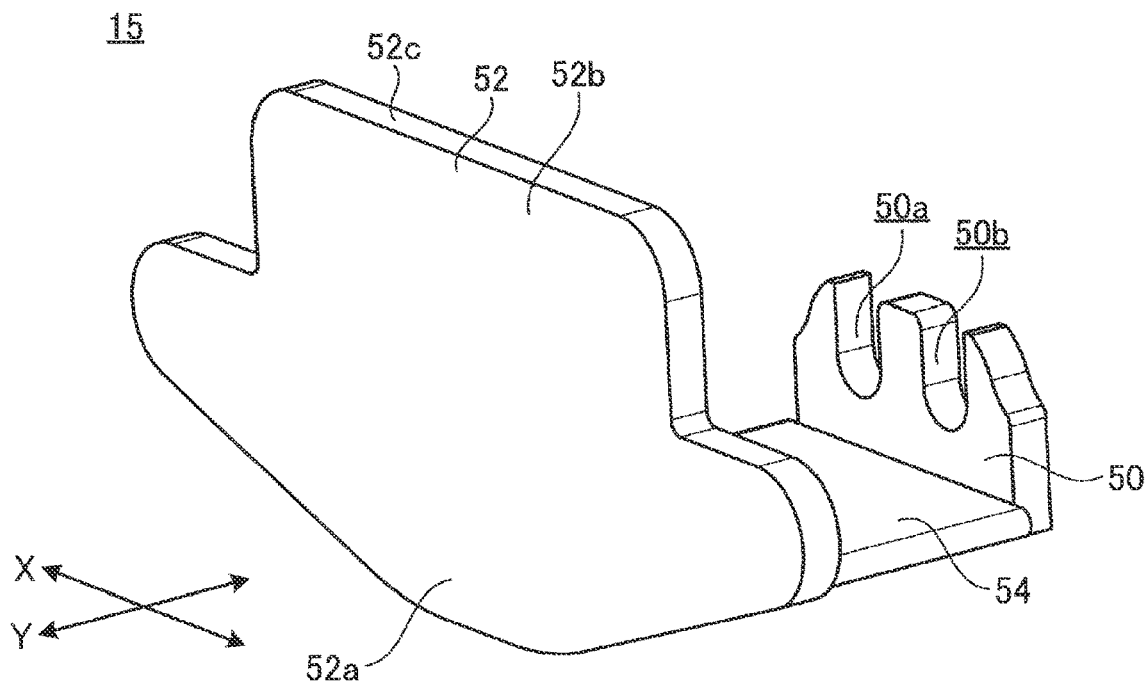
FIG. 5 is a perspective view of the cover member.
Figure 6:
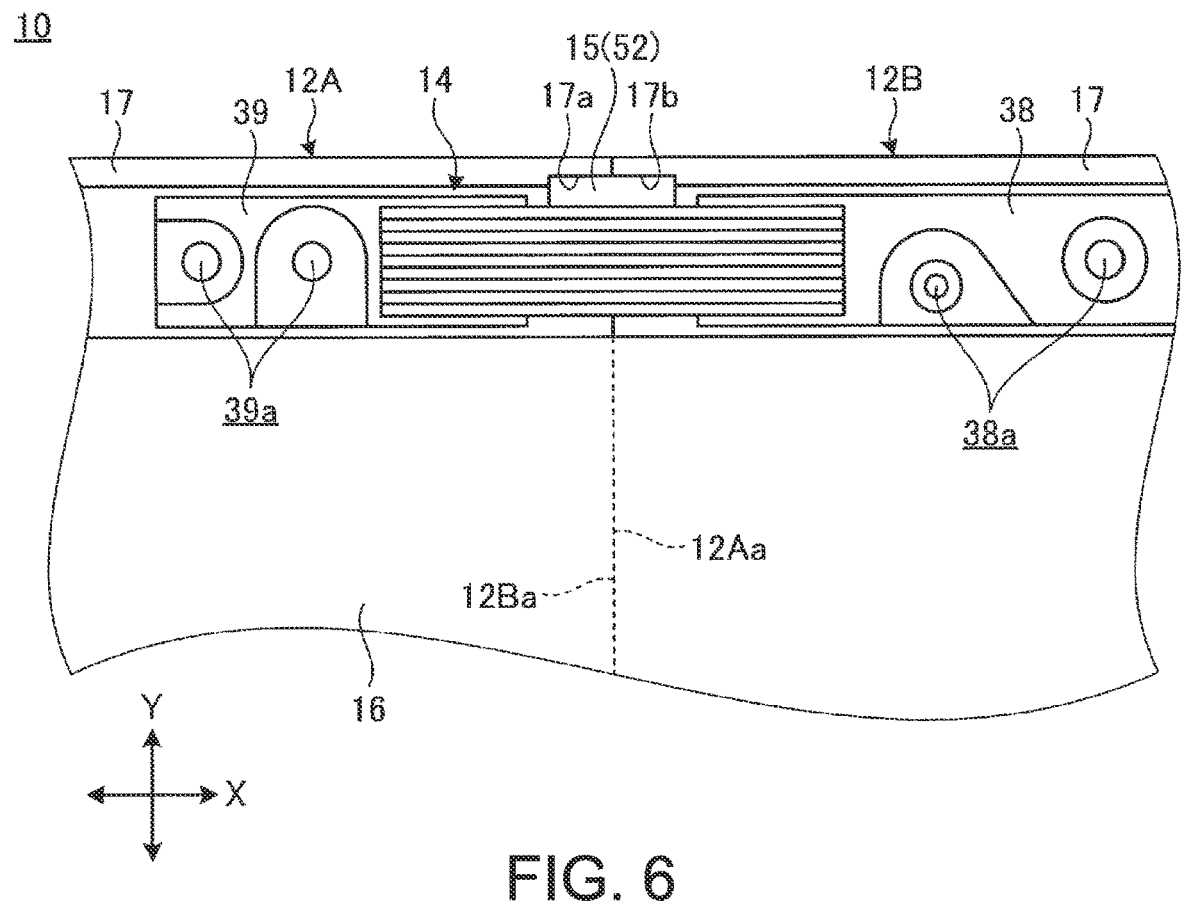
FIG. 6 is a schematic plan view enlarging the hinge device at one end side in the Y direction and its surrounding part.
Figure 7A:
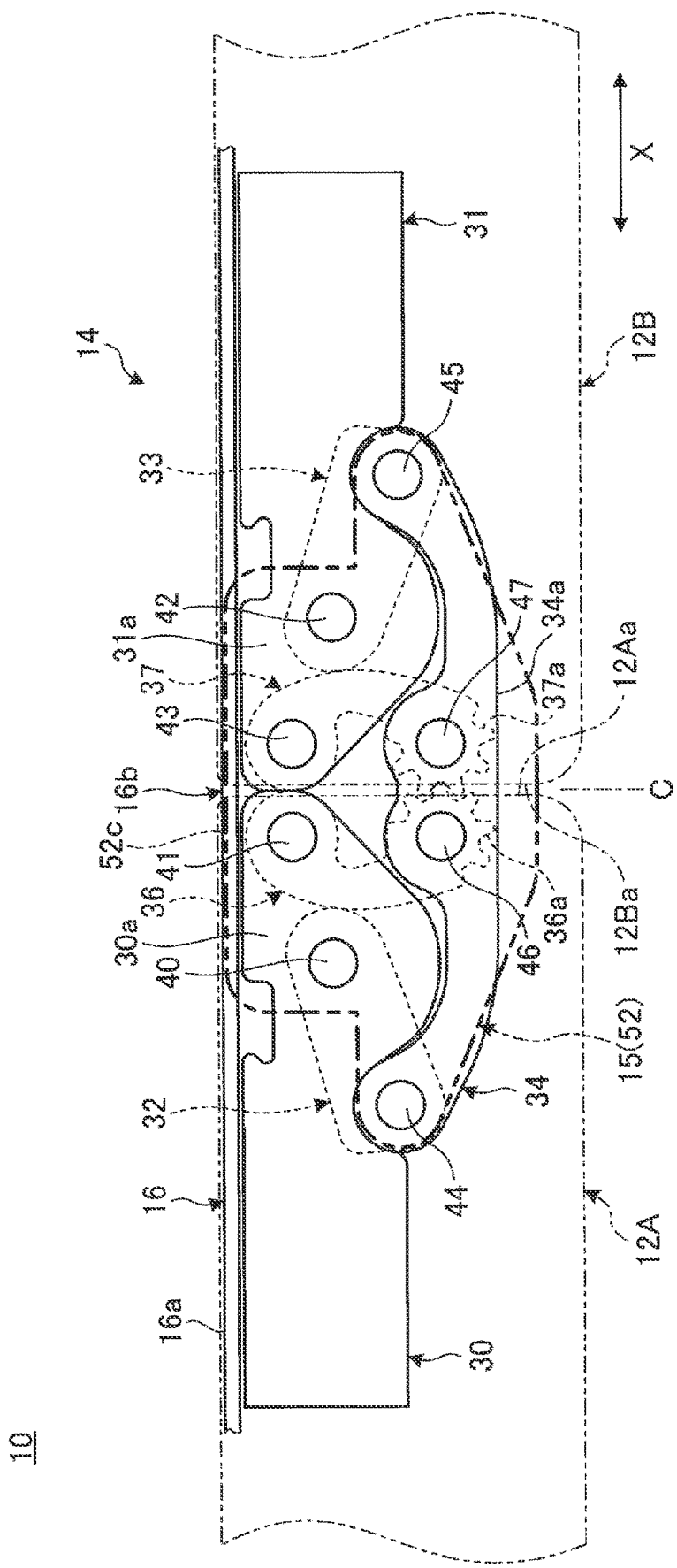
FIG. 7A is a side view schematically illustrating a state of the hinge device and the cover member in the usage form.
Figure 7B:
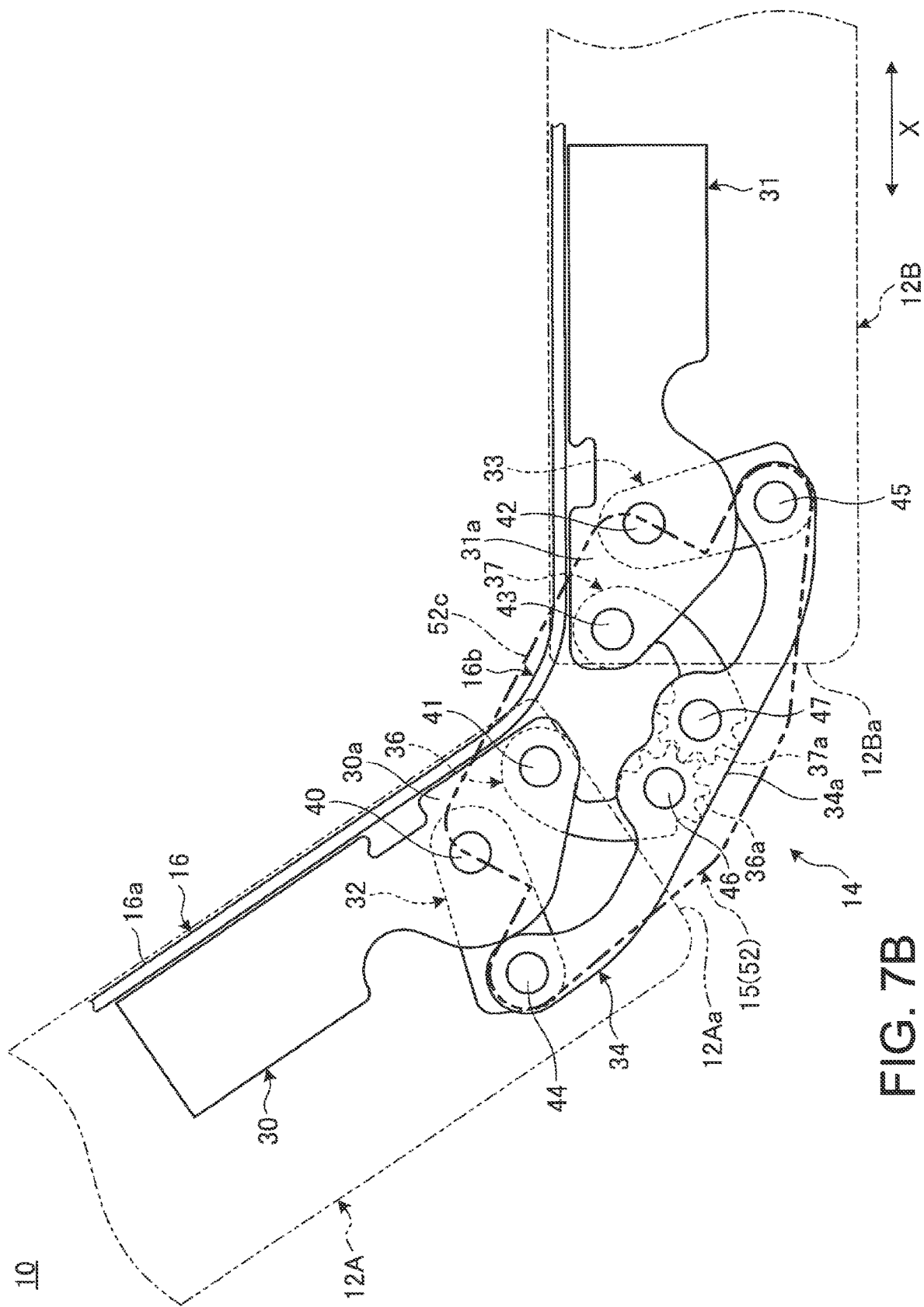
FIG. 7B is a side view schematically illustrating a state where the hinge device is operated so as to be folded from the state illustrated in FIG. 7A.
Figure 7C:
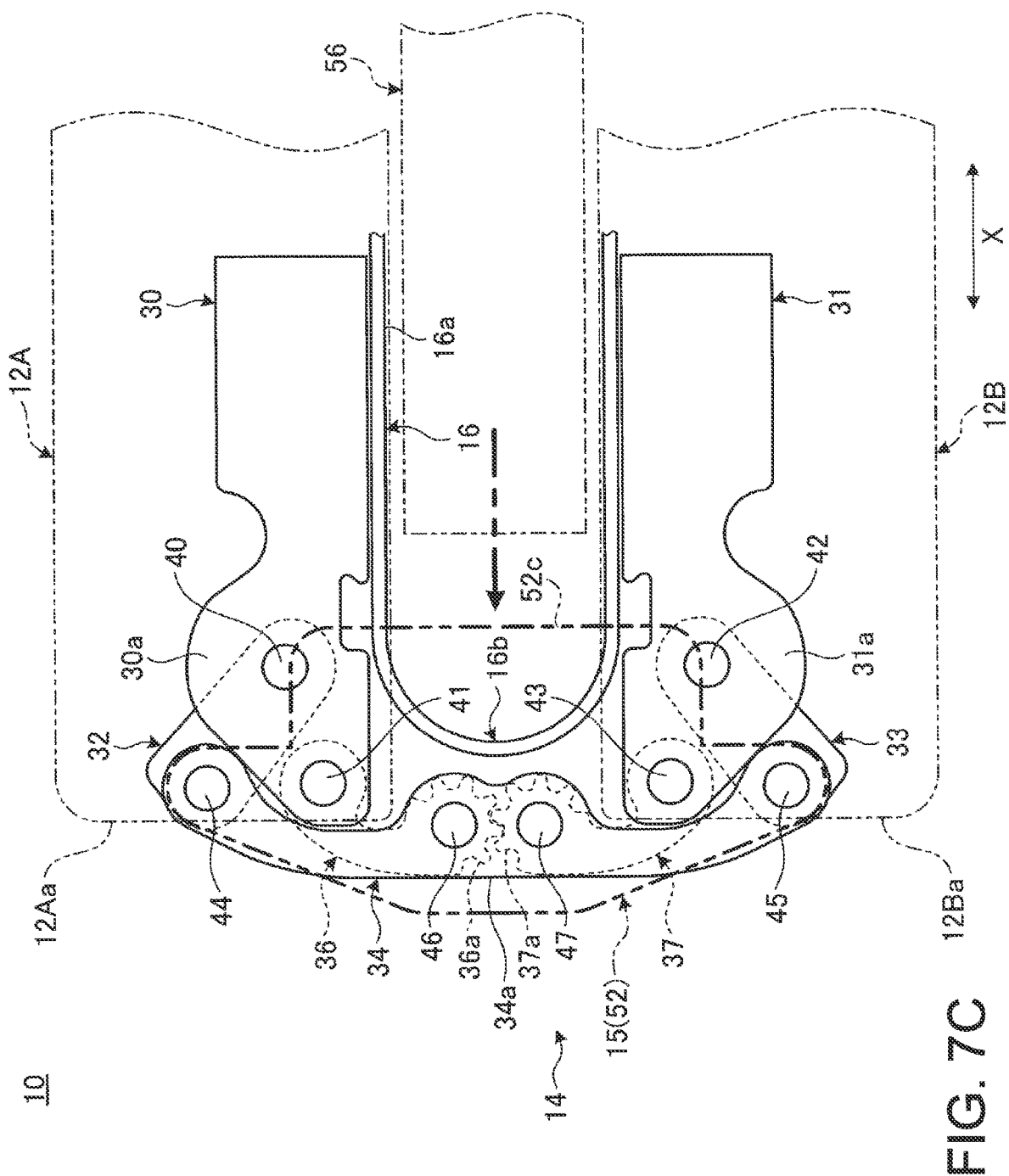
FIG. 7C is a side view schematically illustrating a state where the hinge device is further operated so as to be folded from the state illustrated in FIG. 7B into the storage form.

Next, specific examples of the configurations of the hinge device 14 and the cover member 15 are described. FIG. 4A is an exploded perspective view illustrating a state before the cover member 15 is attached to the hinge device 14. FIG. 4B is a perspective view enlarging the cover member 15 and its surrounding part in a state where the cover member is attached to the hinge device 14. FIG. 5 is a perspective view of the cover member 15. FIG. 6 is a schematic plan view enlarging the hinge device 14 at one end side in the Y direction and its surrounding part. FIG. 7A to FIG. 7C are views illustrating an operation of folding the hinge device 14 from the usage form to the storage form. FIG. 7A is a side view schematically illustrating a state of the hinge device 14 and the cover member 15 in the usage form. FIG. 7B is a side view schematically illustrating a state where the hinge device 14 is operated so as to be folded from the state illustrated in FIG. 7A. FIG. 7C is a side view schematically illustrating a state where the hinge device 14 is further operated so as to be folded from the state illustrated in FIG. 7B into the storage form.

As illustrated in FIG. 2 and FIG. 3, the hinge devices 14 are each disposed at a position which is a side of the outer peripheral edge portion of the display 16 and under the bezel member 20. The hinge device 14 according to the present embodiment rotates the chassis 12A and 12B so that the surface 16a of the display 16 can be always moved along a preset opening/closing track. A side of each hinge device 14 is covered by the cover member 15.

First, an example of the configuration of the hinge device 14 is described. As illustrated in FIG. 4A, FIG. 4B, and FIG. 7A, the hinge device 14 includes a first base plate 30, a second base plate 31, a first link arm 32, a second link arm 33, a coupling plate 34, a first gear arm 36, and a second gear arm 37. The hinge device 14 further includes a first bracket 38, and a second bracket 39. The hinge device 14 supports these respective elements through shafts 40 to 47 serving as rotation shafts. Hereinafter, a positional relationship among each element is described based on the configuration of the hinge device 14 in the usage form illustrated in FIG. 7A, except as otherwise described.

As illustrated in FIG. 3 and FIG. 4A, the first bracket 38 is an attaching bracket of the hinge device 14 for the second chassis 12B and is made of block-shaped metal. The first bracket 38 is screwed to the inner surface 12Bb through a plurality of fastening holes 38a formed at various locations, for example. The second bracket 39 is an attaching bracket of the hinge device 14 for the first chassis 12A and is made of block-shaped metal or resin. The second bracket 39 is screwed to the inner surface 12Ab through a plurality of fastening holes 39a formed at various locations, for example. The brackets 38 and 39 each have recessed portions 38b and 39b, respectively, at end faces facing each other. In the case of the present embodiment, some fastening holes 39a and some fastening holes 38a are used for attaching the support plates 22A and 22B, respectively.

As illustrated in FIG. 4B and FIG. 7A, the first base plate 30 is a thin metallic plate. A plurality of the first base plates 30 are provided side by side in a plate thickness direction at an interval equal to a plate thickness of the first link arm 32 or the first gear arm 36. The first link arm 32 and the first gear arm 36 are sandwiched in a slidable state between the adjacent first base plates 30 and 30. One end side of the first base plate 30 is fixed to the first bracket 38 within the recessed portion 38b and the other end side of the first base plate 30 projects outside the recessed portion 38b. The first base plate 30 has a distal end part 30a projecting outside the recessed portion 38b which part has a substantially tapered triangular shape in a side view. A first shaft 40 and a fifth shaft 41 are pivotally supported on the distal end part 30a. The fifth shaft 41 is provided in a tip of the distal end part 30a. The first shaft 40 is provided in a position closer to the first bracket 38 and a little lower than the fifth shaft 41. Shapes of the base plates 30 and 31 can be changed as necessary. The shafts 40 to 47 are each a metallic shaft, for example.

The second base plate 31 has a structure symmetrical to that of the first base plate 30. That is, one end side of the second base plate 31 is fixed to the second bracket 39 within the recessed portion 39b and the other end side of the second base plate 31 projects outside the recessed portion 39b. A plurality of the second base plates 31 are also provided side by side in a plate thickness direction at an interval equal to a plate thickness of the second link arm 33 or the second gear arm 37. The second link arm 33 and the second gear arm 37 are sandwiched in a slidable state between the adjacent second base plates 31 and 31. A second shaft 42 and a seventh shaft 43 are pivotally supported on a distal end part 31a projecting outside the recessed portion 39b of the second base plate 31. The arrangement of each of the shafts 42 and 43 is also symmetrical to that of each of the shafts 40 and 41 in the first base plate 30.

The first link arm 32 is a thin metallic plate. A plurality of the first link arms 32 are provided side by side in a plate thickness direction at an interval equal to a plate thickness of the first base plate 30. The first link arm 32 is a rectangular plate and gradually slopes downward from a first end portion on the first shaft 40 side toward a second end portion on the opposite side. Shapes of the link arms 32 and 33 can be changed as necessary. The first link arm 32 is disposed side by side with the first gear arm 36 in the same plane and is sandwiched between the adjacent first base plates 30 and 30. The first end portion of the first link arm 32 on one edge portion 12Aa side is rotatably connected to the first base plate 30 through the first shaft 40. The second end portion of the first link arm 32 on the opposite side to the first end portion is rotatably connected to the coupling plate 34 through a third shaft 44. That is, the first link arm 32 connects the coupling plate 34 to be movable relatively to the first base plate 30 fixed to the first chassis 12A through the first bracket 38.

The second link arm 33 has a structure symmetrical to that of the first link arm 32. That is, a first end portion of the second link arm 33 is rotatably connected to the second base plate 31 through the second shaft 42 and a second end portion of the second link arm 33 is rotatably connected to the coupling plate 34 through the fourth shaft 45. That is, the second link arm 33 connects the coupling plate 34 to be movable relatively to the second base plate 31 fixed to the second chassis 12B through the second bracket 39. A plurality of the second link arms 33 are also provided side by side in a plate thickness direction at an interval equal to a plate thickness of the second base plate 31.

The coupling plate 34 is a metallic plate connecting the link arms 32 and 33 on the left and right sides. The coupling plate 34 is curved and substantially dish-shaped in a side view. An outer peripheral end surface 34a (bottom end surface in FIG. 7A) of the coupling plate 34 is disposed along the inner surface of the backbone member 18 in the storage form illustrated in FIG. 1. The coupling plate 34 is disposed in the same plane as each of the base plates 30 and 31 and is located under (outside) each of the base plates 30 and 31. A plurality of the coupling plates 34 are provided side by side in a plate thickness direction at an interval equal to a plate thickness of the first link arm 32 or the second link arm 33. A first end portion of the coupling plate 34 is rotatably connected to the first link arm 32 through the third shaft 44. A second end portion of the coupling plate 34 on the opposite side to the first end portion is rotatably connected to the second link arm 33 through the fourth shaft 45. A sixth shaft 46 and an eighth shaft 47 provided side by side on the left and right sides across the bending center C, are pivotally supported on the center portion of the coupling plate 34.

The first gear arm 36 is a metallic plate. The first gear arm 36 is substantially glasses-shaped in a side view. The first gear arm 36 extends vertically along an end surface of the one edge portion 12Aa of the first chassis 12A. The first gear arm 36 is disposed side by side with the first link arm 32 in the same plane and is sandwiched in a slidable state between the adjacent first base plates 30 and 30. The first gear arm 36 is located closer to the one edge portion 12Aa side than the first link arm 32. A plurality of the first gear arms 36 are provided side by side in a plate thickness direction at an interval equal to a plate thickness of the first base plate 30. A top end portion of the first gear arm 36 is rotatably connected to the first base plate 30 through the fifth shaft 41. A bottom end portion of the first gear arm 36 is rotatably connected to the coupling plate 34 through the sixth shaft 46. The first gear arm 36 has a first gear 36a on a circumferential end surface formed around the sixth shaft 46.

The second gear arm 37 has a structure symmetrical to that of the first gear arm 36. That is, a top end portion of the second gear arm 37 is rotatably connected to the second base plate 31 through the seventh shaft 43, and a bottom end portion of the second gear arm 37 is rotatably connected to the coupling plate 34 through the eighth shaft 47. A plurality of the second gear arms 37 are provided side by side in a plate thickness direction at an interval equal to a plate thickness of the second base plate 31. The second gear arm 37 has a second gear 37a on a circumferential end surface formed around the eighth shaft 47. The second gear 37a engages with the first gear 36a.

The first gear arm 36 and the second gear arm 37 synchronously rotate under the engaging action of each of the gears 36a and 37a. That is, when the first gear arm 36 rotates in the counterclockwise direction around the sixth shaft 46 as an axis of rotation from the state illustrated in FIG. 7A, for example, the second gear arm 37 rotates in the clockwise direction around the eighth shaft 47 as an axis of rotation, and thus both rotation operations are synchronized. Thus, the first gear arm 36 and the second gear arm 37 form a mechanism which synchronizes operations of each element (the first base plate 30 or the first link arm 32) on the first chassis 12A side and each element (the second base plate 31 or the second link arm 33) on the second chassis 12B side of the hinge device 14.

Thus, the hinge device 14 has a laminated structure in which a plurality of the first base plates 30 and the left halves of the coupling plates 34 are arranged side by side and the first link arms 32 and the first gear arms 36 are sandwiched between them, on the first chassis 12A side. The hinge device 14 has a laminated structure in which a plurality of the second base plates 31 and the right halves of the coupling plates 34 are arranged side by side and the second link arm 33 and the second gear arm 37 are sandwiched between them, on the second chassis 12B side. Then, the shafts 40 to 47 each penetrate through these laminated base plates 30 and 31, link arms 32 and 33, coupling plates 34, and gear arms 36 and 37 in a laminated direction and support them. In addition, it is a matter of course that shapes of the respective elements of the hinge device 14, that is, the base plates 30 and 31, the link arms 32 and 33, the coupling plate 34, the gear arms 36 and 37, and the brackets 38 and 39 may be changed as necessary.

Next, an example of the configuration of the cover member 15 is described.

As illustrated in FIG. 4A, FIG. 4B, and FIG. 5, the cover member 15 is a cap-shaped member for covering a side of each hinge device 14. The cover member 15 is made of metallic material or resin material, for example. The cover member 15 is attached to an outer side (top side in FIG. 3) of the hinge device 14 on one end side (top end side in FIG. 3) in the Y direction. The cover member 15 is attached to an outer side (bottom side in FIG. 3) of the hinge device 14 on the other end side (bottom end side in FIG. 3) in the Y direction. Thus, the cover members 15 cover both sides in the Y direction between the one edge portions 12Aa and 12Ba separated in the storage form (refer to FIG. 1). The cover member 15 has an attaching part 50 and a cover plate part 52.

The attaching part 50 is a part for mounting the cover member 15 to the hinge device 14. The attaching part 50 has a fork shape facing upward and has a pair of fitting recessed portions 50a and 50b arranged in the X direction, for example. The fitting recessed portions 50a and 50b are each inserted into gaps between the coupling plates 34 from bottom up and are externally fitted to the shafts 46 and 47, respectively. Thus, the attaching part 50 is attached to the hinge device 14 and integrally formed with the coupling plate 34. A bridge plate 54 extending toward the cover plate part 52 in the Y direction is provided at the bottom end portion of the attaching part 50. The bridge plate 54 extends along the outer peripheral end surface 34a of the coupling plates 34 arranged in the Y direction. The attaching part 50 suffices if the cover member 15 can be mounted to the hinge device 14, and the shape or configuration thereof, an attachment position to the hinge device 14 or the like can be changed as necessary.

The cover plate part 52 is provided at an end of the bridge plate 54 and stands in the side of the hinge device 14. The cover plate part 52 has a shape corresponding to a gap between the left and right brackets 38 and 39, for example, and covers most of elements of the hinge device 14 exposed from this gap (refer to FIG. 4A and FIG. 4B). That is, the cover plate part 52 is disposed laterally to the base plates 30 and 31, the link arms 32 and 33, and the coupling plates 34. In the case of the present embodiment, the cover plate part 52 has a downward arrow shape, for example, and has plate parts 52a and 52b. The plate part 52a is a lower substantially trapezoidal part where the bridge plate 54 is provided. The plate part 52b is a substantially rectangular part upper than the plate part 52a.

As illustrated in FIG. 6, the side plate 17 of the first chassis 12A has a notch-shaped portion 17a opened toward the one edge portion 12Aa. The side plate 17 of the second chassis 12B has a notch-shaped portion 17b opened toward the one edge portion 12Ba. The notch-shaped portions 17a and 17b have a shape obtained by cutting out inside corners of the side plate 17 facing the one edge portions 12Aa and 12Ba and are in communication with each other. In the usage form, the plate part 52b of the cover plate part 52 is disposed in the notch-shaped portions 17a and 17b. Thus, the cover plate part 52 is not exposed to an outer surface of the side plate 17 or does not bulge outside this outer surface.

Next, with reference to FIG. 7A to FIG. 7C, an operation of rotating the portable information device 10 from the usage form to the storage form is described, and in addition, states and operational effects of the cover member 15 in each form are described. It is to be noted that the cover member 15 is illustrated by a dashed-two dotted line in FIG. 7A to FIG. 7C in order to clearly specify the configuration of the hinge device 14, but in practice, the cover plate part 52 of the cover member 15 covers an outer side of the hinge device 14 as illustrated in FIG. 4B.

In the hinge device 14, the first base plate 30 and the second base plate 31 are disposed in parallel side by side in the X direction in the usage form illustrated in FIG. 7A. In this state, tip surfaces of the distal end parts 30a and 31a of the respective base plates 30 and 31 come into contact with or are close to each other. In addition, the first link arm 32 is in a position of having rotated most in the clockwise direction around the first shaft 40 as an axis of rotation. Similarly, the second link arm 33 is in a position of having rotated most in the counterclockwise direction around the second shaft 42 as an axis of rotation. Thus, the coupling plate 34 is in the uppermost position where its left and right both ends are pulled up by the link arms 32 and 33, respectively. It is to be noted that the first gear arm 36 is in a position having rotated most in the clockwise direction around the sixth shaft 46 as an axis of rotation. Similarly, the second gear arm 37 is in a position of having rotated most in the counterclockwise direction around the eighth shaft 47 as an axis of rotation.

Therefore, the hinge device 14 is made thinner in the usage form with the coupling plate 34 approaching closest to the bottom end portions of the respective base plates 30 and 31. Thus, the hinge device 14 is completely contained inside the chassis 12A and 12B in a side view. In addition, the cover member 15 is completely contained inside the side plate 17 of the chassis 12A and 12B. Herein, in the cover member 15, a tip surface 52c of the plate part 52b of the cover plate part 52 is disposed on substantially the same plane as a top end surface of the side plate 17, that is, the bezel member 20 or the surface 16a of the display 16.

Next, when the portable information device 10 is made from the usage form (180° position) to the storage form (0° position) illustrated in FIG. 7C, the chassis 12A and 12B are each grasped by left and right hands, respectively, and are folded in a direction of closing the display 16.

As illustrated in FIG. 7A and FIG. 7B, the coupling plate 34 is then subject to a force to separate the shafts 44 and 45 on both left and right ends and a rotating force according to an angle between the chassis 12A and 12B. As a result, in the hinge device 14, the first link arm 32 rotates in the counterclockwise direction around the first shaft 40 as an axis of rotation in FIG. 7A. At the same time, the second link arm 33 rotates in the clockwise direction around the second shaft 42 as an axis of rotation in FIG. 7A. As a result, a horizontal central part and its surrounding part of the coupling plate 34 are pushed out in a direction of separating from the base plates 30 and 31. Thus, when the hinge device 14 rotates from the usage form to the storage form, the coupling plate 34 moves so as to gradually project outwards. That is, the coupling plate 34 moves in so as to fill a gap between the one edge portions 12Aa and 12Ba of the chassis 12A and 12B separated from each other and gradually separates from a rear surface of the bending region 16b of the display 16. Herein, the cover member 15 is integrally formed with the coupling plate 34 through the attaching part 50. Thus, the cover member 15 also integrally operates with the coupling plate 34.

Thus, in the hinge device 14, the coupling plate 34 located on the rear surface side of the bending region 16b of the display 16 separates from the display 16 with the closing operation of the chassis 12A and 12B. That is, the hinge device 14 is configured to always move the surface 16a of the display 16 along a preset opening/closing track, as described above. Thus, in a folding operation, there are concerns that the coupling plate 34 located on the outer side than the display 16 comes close to and interferes with the display 16 due to a turning radius difference. In this regard, in the hinge device 14, since the coupling plate 34 moves in a direction of escaping from the display 16 in the folding operation, interference between both is prevented. As a result, the hinge device 14 can smoothly bend the bending region 16b of the display 16 while maintaining a desired curvature and can prevent the occurrence of a failure of the display 16. It is to be noted that the cover plate part 52 of the cover member 15 is disposed laterally to the display 16. Thus, the tip surface 52c gradually moves from a lateral side of the display 16 so as to project beyond the surface 16a.

In this rotating operation, the gear arms 36 and 37 each rotate in synchronization in opposite directions by the engaging action of the mutual gears 36a and 37a. Specifically, the first gear arm 36 rotates in the counterclockwise direction in FIG. 7A around the fifth shaft 41 as an axis of rotation. At the same time, the second gear arm 37 rotates in the clockwise direction in FIG. 7A around the seventh shaft 43 as an axis of rotation. By this synchronous action of the gear arms 36 and 37, rotating operations of the link arms 32 and 33 in the opposite directions to each other also synchronize. As a result, during the rotating operation, the coupling plate 34 rotates and moves while maintaining a position corresponding to an angular position between the chassis 12A and 12B without causing inclination etc. That is, in the hinge device 14, operations of each element on the first chassis 12A side and each element on the second chassis 12B side in rotating the chassis 12A and 12B synchronize. Thus, with the hinge device 14, the operation of the coupling plate 34 can be evenly maintained with respect to the left and right chassis 12A and 12B and the chassis 12A and 12B can be rotated with high stability. It is to be noted that, in specifications not required to enhance the stability in a rotating operation, the respective gear arms 36 and 37, the fifth shaft 41, the seventh shaft 43, the sixth shaft 46, and the eighth shaft 47 connected thereto may be omitted.

Then, the hinge device 14 has a laminated structure in which a plurality of the base plates 30 and 31 are each arranged side by side and the link arms 32 and 33 and the gear arms 36 and 37 are each sandwiched between them. Thus, the hinge device 14 can generate a predetermined rotation torque by slide resistance between the respective base plates 30 and 31, the respective link arms 32 and 33, and the respective gear arms 36 and 37 in the rotating operation. As a result, the rotating operation of the chassis 12A and 12B by the hinge device 14 is stabilized. Thus, the chassis 12A and 12B can be rotated to a 120 degree position to maintain the angular position between the chassis 12A and 12B in this state, as illustrated in FIG. 7B, for example. Then, the portable information device 10 can also be used as a Laptop PC by displaying a software keyboard etc. on a part of the display 16 on the second chassis 12B side in FIG. 7B, for example. It is to be noted that the rotation torque of the hinge device 14 may be generated by a configuration in which torque is loaded to a rotating part between the respective shafts 40 to 47 and the first base plate 30 or the first link arm 32 etc., for example.

In the storage form illustrated in FIG. 7C, the hinge device 14 has an arrangement in which the respective base plates 30 and 31 are in parallel with each other and face each other through the display 16. In this state, the first link arm 32 is in a position of having rotated most in the counterclockwise direction with respect to the first base plate 30 around the first shaft 40 as an axis of rotation. Similarly, the second link arm 33 is in a position of having rotated most in the clockwise direction with respect to the second base plate 31 around the second shaft 42 as an axis of rotation.

Therefore, the coupling plate 34 is at a position where its left and right both ends are pulled in a direction of coming close to the display 16 again by the link arms 32 and 33, respectively, in the storage form. Herein, most of the coupling plate 34 including the outer peripheral end surface 34a projects outwards from the one edge portions 12Aa and 12Ba of the respective chassis 12A and 12B. On the other hand, an end surface on an inner peripheral side opposite to the outer peripheral end surface 34a is disposed to face the rear surface of the bending region 16b of the display 16 across a predetermined gap. Therefore, the hinge device 14 in the storage form is configured so as not to interfere with the display 16 while being made thinner in the X direction. Although illustrating the backbone member 18 is omitted in FIG. 7C, the outer peripheral end surface 34a of the coupling plate 34 of each hinge device 14 at both ends in the Y direction is covered by the backbone member 18 or a cover member (not illustrated) for seamlessly covering the entire rear surfaces of both chassis 12A and 12B.

In this storage form, the cover member 15 is in a state in which the cover plate part 52 covers at least a part of a side of the gap formed by the separation of the one edge portions 12Aa and 12Ba of the chassis 12A and 12B (refer to FIG. 7C). Herein, the cover plate part 52 is at a position where its tip surface 52c projects inwards beyond the surface 16a of the display 16 in a side of the display 16. Specifically, the tip surface 52c of the cover plate part 52 is at a position where it projects to an inner side (right side in FIG. 7C) in a bending direction of the display 16 than the surface 16a of the bending part (bending region 16b) formed in a circular arc shape of the display 16. Thus, in the portable information device 10 in the storage form, both sides of the gap between the one edge portions 12Aa and 12Ba of the chassis 12A and 12B are covered by the cover members 15. In the storage form, the cover plate part 52 also covers up a side of the bezel member 20 interposed in the gap between the one edge portions 12Aa and 12Ba.

It is to be noted that since the rotating operation from the storage form illustrated in FIG. 7C to the usage form illustrated in FIG. 7A is reverse operation of the above-described folding operation, its description is omitted.

As described above, the portable information device 10 according to the present embodiment includes the hinge device 14 rotatably connecting the one edge portions 12Aa and 12Ba of the chassis 12A and 12B, the foldable display 16, and the cover member 15 covering the side of the hinge device 14. The hinge device 14 connects the chassis 12A and 12B so as to be foldable from the usage form in which their top surfaces are on substantially the same plane to the storage form in which their top surfaces face each other. Then, the cover member 15 is contained inside the chassis 12A and 12B in the usage form (refer to FIG. 7A), and covers at least a part of the side of the gap formed by the separation of the one edge portions 12Aa and 12Ba of the respective chassis 12A and 12B in the storage form (refer to FIG. 7C).

Thus, the cover member 15 has a cover function of preventing the hinge device 14 or the bending part of the display 16 from being exposed from the side of the gap between the one edge portions 12Aa and 12Ba of the chassis 12A and 12B in the storage form. Thus, the portable information device 10 is capable of suppressing reduction in appearance quality when it is folded. In addition, the cover member 15 also has a cover function of preventing a user from touching the bending part of the display 16 and the bezel member 20 directly from the side of the gap between the chassis 12A and 12B. Thus, the portable information device 10 when folded can prevent the user from touching the bending part of the display 16 or the bezel member 20 with one's finger etc. so that it fails. The cover member 15 can prevent foreign matter from entering from the side of the gap between the chassis 12A and 12B.

The cover member 15 according to the present embodiment is disposed at a position where the tip surface 52c of the cover plate part 52 projects to an inner side than the surface 16a of the bending part of the display 16, in the storage form. That is, for the portable information device 10, a situation where a keyboard device 56 etc. is contained between the folded chassis 12A and 12B and carried is also supposed as illustrated in FIG. 7C. In this state, impact of carrying or dropping etc. may be applied to the portable information device 10. At that time, in the portable information device 10, even if the keyboard device 56 moved at considerable speed in the direction of an arrow in FIG. 7C, the keyboard device 56 would stop by abutment against the tip surface 52c of the cover plate part 52. Thus, the portable information device 10 can prevent foreign matter such as the keyboard device 56 from colliding with the bending part of the display 16. That is, the cover member 15 has a stopper function of preventing foreign matter from colliding with the display 16. The keyboard device 56 is a wireless keyboard to be wirelessly connected to the portable information device 10, for example.

In the portable information device 10 according to the present embodiment, the hinge device 14 has the first base plate 30, the second base plate 31, the first link arm 32 having the first end portion rotatably connected to the first base plate 30 through the first shaft 40, the second link arm 33 having the first end portion rotatably connected to the second base plate 31 through the second shaft 42, and the coupling plate 34 having the first end portion rotatably connected to the second end portion of the first link arm 32 through the third shaft 44 and the second end portion rotatably connected to the second end portion of the second link arm 33 through the fourth shaft 45. Then, the hinge device 14 as a whole is disposed below the display surface, under the bezel member 20 in the example of the above-described configuration, regardless of the opening/closing state of the second chassis 12B to the first chassis 12A.

Thus, in the portable information device 10, the coupling plate 34 is connected to the base plates 30 and 31 fixed to the chassis 12A and 12B through the link arms 32 and 33. Thus, in the portable information device 10, the coupling plate 34 moves so as to separate from the bending region 16b of the display 16 in the folding operation of the chassis 12A and 12B. That is, in the portable information device 10, each element of the hinge device 14 located on the outer side than the surface 16a of the display 16 is subject to a turning radius difference in folding. However, the hinge device 14 can absorb the above-described turning radius difference by the movement of the coupling plate 34 in a direction of separating from the display 16 in folding. Then, in the portable information device 10, all elements of the hinge device 14, such as the base plates 30 and 31, the link arms 32 and 33, and the coupling plate 34, or each shaft 40 etc., are disposed on the outer side than the surface 16a of the display 16. Specifically, the hinge device 14 is contained under the bezel member 20 in the above configuration example. Thus, the portable information device 10 can suppress reduction in appearance quality due to exposure of the hinge device 14 to the top surface of the chassis 12A and 12B.

In addition, it is a matter of course that the present invention is not limited to the embodiments described above and can be freely altered without deviating from the scope of the present invention.

In the above, the configuration in which the cover member 15 is mounted to each of the hinge devices 14 located at both end portions of the one edge portions 12Aa and 12Ba, is illustrated by an example. However, the respective bridge plates 54 of the cover members 15 on both ends in the Y direction may be extended in the Y direction to be formed into one body, for example. Thus, since the two cover members 15 are made up of one part, the number of parts can be reduced. In addition, since a bottom surface of the bridge plate 54 extending in the Y direction practically functions as the backbone member 18, the backbone member 18 can be omitted.

In the above, the configuration in which the cover member 15 is applied to the hinge device 14 formed by laminating a plurality of the base plates 30 and 31 etc., is illustrated by an example. However, the hinge device 14 may have other configurations as long as the chassis 12A and 12B can be rotatably connected.

In the above, the configuration in which the base plates 30 and 31 are fixed to the chassis 12A and 12B with the brackets 38 and 39, is illustrated by an example. However, the base plates 30 and 31 may be directly fixed to the chassis 12A and 12B without the brackets 38 and 39. It is to be noted that using the brackets 38 and 39 improves the attachability of the hinge device 14 to the chassis 12A and 12B and the manufacturing efficiency.

Although the portable information device 10 foldable into a double-folded state like a book is illustrated by an example in the above, the present invention can be applied to various configurations, such as a hinged double door configuration of foldably connecting respective small chassis members to right and left edge portions of a large chassis member, an S-type folding configuration of connecting respective chassis members with different folding directions to right and left edge portions of one chassis member, a J-type configuration of foldably connecting a small chassis member to either right or left edge portion of a large chassis member and the like, other than the configuration of folding chassis members of the same shape into a double-folded state, and the number of connected chassis members may be four or more.

The invention claimed is:

1. A portable information device, comprising:
a first chassis having one edge portion;
a second chassis having one edge portion adjacent to the one edge portion of the first chassis;
a hinge device rotatably connecting the one edge portions of the first chassis and the second chassis;
a display seamlessly covering the first chassis and the second chassis and is foldable; and
a cover member covering a side of the hinge device,
wherein the hinge device connects the first chassis and the second chassis so as to be foldable from a usage form, in which a top surface of the first chassis and a top surface of the second chassis are on substantially the same plane, to a storage form in which the top surfaces of the first chassis and the second chassis face each other,
wherein the cover member is contained inside the first chassis and the second chassis in the usage form and covers a side of a gap formed by separation of the one edge portions of the first chassis and the second chassis in the storage form,
wherein the cover member comprises:
an attaching part attached to the hinge device; and
a cover plate part in a side of the hinge device, and
in the storage form, a tip surface is near a bending part of the display and extends beyond the bending part in a direction towards opposite edges of the display,
wherein the hinge device comprises:
a first base plate fixed to the first chassis;
a second base plate fixed to the second chassis;
a first link arm having a first end portion rotatably connected to the first base plate through a first shaft;
a second link arm having a first end portion rotatably connected to the second base plate through a second shaft; and
a coupling plate having a first end portion rotatably connected to a second end portion of the first link arm through a third shaft, and a second end portion rotatably connected to a second end portion of the second link arm through a fourth shaft,
wherein the attaching part of the cover member is attached to the coupling plate, and the cover plate part is disposed lateral to the first base plate, the second base plate, the first link arm, the second link arm, and the coupling plate.

2. The portable information device according to claim 1, wherein notch-shaped portions open toward the one edge portions and are in communication with each other, and each are in outer peripheral edge portions of the first chassis and the second chassis,
wherein the cover plate part is in the notch-shaped portions.

3. The portable information device according to claim 1, wherein the hinge device is at least disposed at a first end portion and a second end portion in a longitudinal direction of the one edge portions of the first chassis and the second chassis.

4. The portable information device according to claim 1, further comprising:
a bezel member covering a part of a display surface of the first chassis and the second chassis, other than the display,
wherein the hinge device is under the bezel member.

* * * * *